US011932944B2

United States Patent
Cho et al.

(10) Patent No.: US 11,932,944 B2
(45) Date of Patent: Mar. 19, 2024

(54) PIPE AND MANUFACTURING METHOD THEREFOR

(71) Applicant: KOLON INDUSTRIES, INC, Seoul (KR)

(72) Inventors: Geun Sang Cho, Seoul (KR); Choongnyun Paul Kim, Seoul (KR); Kwan Min Choi, Seoul (KR)

(73) Assignee: KOLON INDUSTRIES, INC, Seoul (KR)

( * ) Notice: Subject to any disclaimer, the term of this patent is extended or adjusted under 35 U.S.C. 154(b) by 0 days.

(21) Appl. No.: 17/758,778

(22) PCT Filed: Jan. 14, 2021

(86) PCT No.: PCT/KR2021/000570
§ 371 (c)(1),
(2) Date: Jul. 13, 2022

(87) PCT Pub. No.: WO2021/145710
PCT Pub. Date: Jul. 22, 2021

(65) Prior Publication Data
US 2023/0053703 A1  Feb. 23, 2023

(30) Foreign Application Priority Data
Jan. 17, 2020 (KR) .......... 10-2020-0006341

(51) Int. Cl.
F16L 9/14 (2006.01)
C23C 24/08 (2006.01)
F16L 58/08 (2006.01)

(52) U.S. Cl.
CPC ............ *C23C 24/08* (2013.01); *F16L 58/08* (2013.01)

(58) Field of Classification Search
CPC ........................................... F16L 58/08
USPC ................................... 138/145, 146
See application file for complete search history.

(56) References Cited

U.S. PATENT DOCUMENTS

| 3,986,867 | A | * | 10/1976 | Masumoto | ............. C22C 45/02 |
| | | | | | 420/583 |
| 4,075,376 | A | * | 2/1978 | Jaeger | ...................... C23C 4/06 |
| | | | | | 428/34.6 |
| 6,071,563 | A | * | 6/2000 | Kozlowski | ............... C23D 5/00 |
| | | | | | 427/419.4 |
| 2010/0279023 | A1 | * | 11/2010 | Kusinski | ................ C23C 10/28 |
| | | | | | 427/372.2 |

(Continued)

FOREIGN PATENT DOCUMENTS

| JP | H10324976 A | 12/1998 |
| KR | 19960004831 A | 2/1996 |

(Continued)

*Primary Examiner* — James F Hook
(74) *Attorney, Agent, or Firm* — Harvest IP Law, LLP

(57) ABSTRACT

A pipe according to the present disclosure comprises: a hollow tube body in which fluids of different temperatures pass through the inside and outside thereof; and a coating layer which is provided on an external surface of the hollow tube body, and which has an alloy comprising an amorphous phase, wherein the alloy comprises Fe, and comprises at least one or more first component selected from the group consisting of Cr, Mo and Co, and at least one or more second component selected from the group consisting of B, C, Si and Nb.

10 Claims, 4 Drawing Sheets

(a)

(b)

(c)

(56) References Cited

U.S. PATENT DOCUMENTS

| | | | |
|---|---|---|---|
| 2013/0118728 A1* | 5/2013 | David | E21B 17/1085 166/85.1 |
| 2013/0167965 A1* | 7/2013 | Cheney | F16L 9/14 138/146 |
| 2017/0159156 A1 | 6/2017 | Chou | |
| 2022/0299153 A1* | 9/2022 | Kim | C23C 4/134 |
| 2022/0389547 A1* | 12/2022 | Kim | B22F 1/08 |
| 2023/0043932 A1* | 2/2023 | Kim | C09D 7/68 |

FOREIGN PATENT DOCUMENTS

| | | | |
|---|---|---|---|
| KR | 10-20060037202 A | 5/2006 | |
| KR | 10-20120027284 A | 3/2012 | |
| KR | 20120113093 A | 10/2012 | |
| WO | 2010127015 A2 | 11/2010 | |
| WO | 2015168481 A1 | 11/2015 | |
| WO | 2020013632 A1 | 1/2020 | |

* cited by examiner

PIPE AND MANUFACTURING METHOD THEREFOR

CROSS REFERENCE TO RELATED APPLICATIONS

This application is a National Stage of International Application No. PCT/KR2021/000570 filed Jan. 14, 2021, claiming priority based on Korean Patent Application No. 10-2020-0006341 filed on Jan. 17, 2020.

TECHNICAL FIELD

The present disclosure relates to a pipe and a manufacturing method therefor, and more particularly, a pipe having a coating layer having excellent corrosion resistance on an external surface in a high-temperature external condition environment, and a method therefor.

BACKGROUND ART

Thermal power plants have accounted for a large proportion of electricity production locally and also around the world, producing about 80% of world's electricity. In Korea, thermal power plants are an important power generation facility responsible for 40% of electricity production.

Greenhouse gas generated in a combustion process of coal may account for 25% of the total content of generation thereof, and in some of OECD countries including Korea, a renewable energy portfolio has been implemented to solve the problem of global warming caused by greenhouse gas emissions.

Also, in thermal power plants, biomass co-firing has been applied to replace coal fuel with biomass as a part of a mandatory implementation of the renewable energy portfolio for new and renewable energy. Co-firing using biomass has attracted attention as an energy source which may solve the problem of greenhouse gas emissions and may also solve the problem of depletion of fossil fuels.

In the EU, waste power generation began to spread in the 1960s, but the high-temperature corrosion problem of boiler heat recovery pipes occurred frequently. For this reason, various improvements have been made in a method of combusting waste, a structure of a boiler, a method of protecting the boiler heat recovery pipe, and corrosion-resistant materials.

Biomass and waste incineration boilers may often cause damage to evaporation pipes and superheating engines in a highly corrosive environment as compared to coal-fired boilers. To prevent corrosion of water-cooled wall pipes, lining with fireproof materials has been put to practical use in the EU since early, and recently, high alloy welding (overaying) has been widely applied in the United States. Also, to prevent corrosion of the overheating engine, measures to lower the surface temperature of the overheating engine such as lowering the steam temperature from 500° C. to 450° C. or lower, or lowering the superheater inlet gas temperature to 650° C. or lower, have been adopted, and improvements in the boiler structure have also been adopted. A typical example may be the adoption of a tail-end type boiler having high durability.

However, when co-firing of biomass is applied to a power generation facility designed based on coal fuel, there may be a problem in that durability of the facility may greatly degrade due to high-temperature corrosion caused by a large amount of chlorine included in biomass. In particular, flame edge corrosion occurring outside a heat exchanger may occur at a rate about 4,000 times faster than that of general coal combustion during biomass co-firing, which may reduce a thickness of the heat exchanger and may ultimately cause breakage of the heat exchanger.

As such, the biggest problem in incineration boiler operation may be high-temperature corrosion, and it has been known that 70% of the causes of facility shutdown are related to high-temperature corrosion, and further, it has been a case estimating that ⅓ of the annual maintenance costs is corrosion-related.

Also, in addition to power plants, components for a gas turbine which burns fuel at high temperatures may be used in aircraft, and there may be a problem in that the surface of a base material may be decomposed or cracked due to the high-temperature corrosion shape.

Therefore, to secure operational economics such as reducing operating costs as well as stable operation, piping or pipes used in a high-temperature condition may need excellent high-temperature resistance, corrosion resistance, or the like, on an external surface in addition to a fluid flowing therein, and a method of improving high temperature resistance and lifespan by forming a thermal barrier coating (TBC) on the surface of a metal base material has been conventionally used.

The thermal barrier coating layer may be mainly formed of a ceramic material or a material including aluminum oxide, titanium oxide, zirconium oxide, or silica, but depending on the component, damage such as oxidation, deterioration, cracking, peeling, or the like, may occur, such that in reality, the lifespan may be 2-3 years, and there has been a limitation in life extension.

DISCLOSURE

Technical Problem

A pipe according to an aspect of the present disclosure may has been devised to address the problems of the prior art, and a purpose thereof is to provide a pipe having an improved lifespan by preventing wear and corrosion in harsh and corrosive environments of high temperature and acidity.

Also, a pipe having excellent strength and mechanical properties even in a corrosive environment and including a coating layer which may be less prone to peeling or cracking on a surface caused by a high temperature condition or sudden changes in temperature may be provided.

Technical Solution

An aspect of the present disclosure relates to a pipe including a hollow tube body in which fluids having different temperatures pass through the inside and the outside thereof; and a coating layer provided on an external surface of the hollow tube body and having an alloy including an amorphous phase, the alloy may include Fe, and
at least one or more first component selected from a group consisting of Cr, Mo and Co, and at least one or more second components selected from a group consisting of B, C, Si and Nb.

In this case, a coefficient of thermal expansion of the alloy may be 1.0 to 1.4 times a coefficient of thermal expansion of the hollow tube body.

The hollow tube body may be formed of a material including iron (Fe).

Also, based on 100 parts by weight of Fe, the first component is included in 30 to 140 parts by weight and the second component may be included in 4 to 20 parts by weight.

The second component may be at least two or more selected from a group consisting of B, C, Si and Nb.

The alloy may include at least one or more third component selected from a group consisting of W, Y, Mn, Al, Zr, Ni, Sc and P.

The third component may be included in less than 1.125 parts by weight based on 100 parts by weight of Fe.

A thickness of the coating layer may be 100 μm to 600 μm, the coating layer has a coating density of 98 to 99.9%, and a Vickers hardness of the coating layer may be 700 to 1,200 Hv.

According to another aspect of the present disclosure, a method of manufacturing a pipe includes:

preparing an alloy powder, including preparing an alloy powder having a composition including at least one or more first components selected from a group consisting of Cr, Mo and Co and at least one or more second components selected from a group consisting of B, C, Si and Nb, and Fe; and forming a coating layer, including forming a coating layer having an amorphous phase by thermally spraying the alloy powder to an external surface of a hollow tube body.

The forming the coating layer may include bonding the hollow tube body to the coating layer by thermally spraying the alloy powder directly to a surface of the hollow tube body.

The coating layer may include an amorphous phase in a ratio of 90 to 100 vol %.

The method may further include performing a surface treatment on a coating layer, including treating a surface of the coating layer, after the forming the coating layer.

A coefficient of thermal expansion of the coating layer may be 1.0 to 1.4 times a coefficient of thermal expansion of the hollow tube body.

Advantageous Effects

According to a pipe of the present disclosure, a coating layer formed on an external surface of a hollow tube body may be formed of an alloy composition having a high amorphous formation ability such that a ratio of the amorphous phase included in the formed coating layer may be high, and accordingly, properties of the amorphous phase may be excellently included.

For example, as for the coating layer, a difference in coefficients of thermal expansion with a hollow tube body used as a base material may be in the range of 1.0 to 1.4 times, such that, even under high-temperature conditions or a large temperature difference, the problems in which the coating layer is peeled off from the hollow tube body which is the base material or the surface properties are deteriorated may less occur such that there may be the effect of prolonging lifespan.

Also, the coating layer of the present disclosure may have excellent hardness and excellent abrasion resistance and corrosion resistance against acid, such that an operating lifespan of the pipe may be extended and stable operation of equipment may be possible even in a high temperature and severely corrosive environment as in a heat exchanger of a power plant, and accordingly, the effect of improving facility stability and economic feasibility may be provided.

BEST MODE FOR INVENTION

Before describing the present disclosure in detail below, the terms used herein may be provided to describe specific embodiments, and may not be intended to limit the scope of the present disclosure, which is limited only by the appended claims. It should be understood that all the technical and scientific terms used herein may have the same meaning as commonly understood by those of ordinary skill in the art, unless otherwise indicated.

Here, 1) the shape, size, ratio, angle, number, or the like, in the accompanying drawings are schematic and may be slightly modified. 2) Since the drawing is illustrated from a view of an observer, the direction or position of the drawing may be varied depending on an observer's position. 3) Even when the reference numbers are different, the same reference numbers may be used for the same portions.

4) When 'comprises, comprises, comprising, have, is formed', or the like, are used, other parts may be added unless 'only' is used. 5) When a component is described in a singular from, the component may also be interpreted as a plurality of components. 6) Even when the shape, size comparison, positional relationship, or the like, are not described as 'approximately, substantially', it is interpreted to include a normal error range.

7) Even when the terms such as 'after, before, then, subsequently, in this case' are used, the terms are not used as the meaning of limiting the position in time-wise. 8) The terms such as 'first, second, and third' are simply used selectively, interchangeably, or repeatedly for the convenience of classification and are not to be interpreted in a limiting sense.

9) When a positional relationship of two portions is described using 'on, in an upper portion, in a lower portion, adjacent to, on the side, between', or the like, unless 'right' is used, one or more other portions may be disposed between the two portions. 10) When portions are electrically connected using 'or', not only portions alone but also combinations thereof may be included, but when portions are electrically connected using 'or, one of', the portions are interpreted as being provided individually.

In the present specification, amorphous refers to amorphous commonly used, that is, a phase in which crystals are not formed in a solid, which may be used as an amorphous phase, that is, a phase not having a regular structure.

Also, in the present specification, an iron-based amorphous alloy powder refers to a powder in which iron is included in the largest weight ratio, and an amorphous is not simply included in the powder but may substantially occupy the majority.

One aspect of the present disclosure may be a pipe including a coating layer formed therein, and the layer may be formed on an external surface of a base material of a hollow tube body having a hollow therein and may improve or protect various surface properties of the pipe. Here, the term "pipe" may include a pipe for the purpose of transporting an object and may also include a tube of a hollow tube body in which heat exchange may occur on internal and external surfaces of the pipe.

The pipe according to an embodiment of the present disclosure may include a coating layer formed on the surface of a hollow tube body such as a pipe or tube, which may be a component used in a boiler heat exchanger or an engine turbine of a power plant, as a base material.

The hollow tube body, which is a base material, may have a tube form having an inner diameter and an outer diameter, such that different fluids may flow in an internal portion and an external portion, and fluids having different temperatures may pass therethrough. The pipe in an embodiment of the present disclosure may include pipes such as a pipe and a water pipe included in a main body of a boiler, and cooling water for heat exchange may pass through the pipe included in a heat exchanger, and the external portion may be exposed to a high temperature condition of the boiler for a long time, such that the risk of wear, erosion and corrosion by steam and pollutants may be extremely high.

For example, in the case of a boiler, the internal temperature of the combustion chamber may reach approximately 400 to 500° C., and in the case of a power plant, the temperature may be higher than 500° C. In this case, depending on the quality of a gas used as a raw material or the type of fuel, metal erosion by exhaust gas may occur.

In particular, a sulfur (S) component included as impurities in the combustion process may combine with oxygen or hydrogen in the air and may be acidified as sulfuric acid, or the like, and accordingly, in the case of a metal material having low acid resistance, the external wall of the pipe may be easily eroded. Such erosion may be a major cause of lowering durability and airtightness of the pipe and lowering the heat exchange efficiency.

The size and material of the pipe, which is a base material, is not limited, and the coating layer of the present disclosure may be formed on a pipe used in a heat exchanger of a boiler, regardless of the size and material thereof. However, preferably, a base material formed of an iron-based alloy including iron (Fe) as a main component or an iron-based material including iron may be used.

As the pipe, a base material, an alloy including iron (Fe), chromium (Cr), and molybdenum (Mo) may be used, for example, and more specifically, alloy steel including 9 wt % chromium and 1 wt % molybdenum may be used as a material of the pipe.

The coating layer may be preferably formed of a material having excellent resistance to oxidation, corrosion, abrasion, crack formation, or the like, even under conditions such as high temperature. As a material of the coating layer, a material including an iron-based amorphous alloy may be used, for example.

The coating layer may preferably be an alloy coating layer formed of an alloy including an amorphous phase. The amorphous alloy included in the alloy coating layer may preferably be an iron-based amorphous alloy including Fe.

The composition of the iron-based alloy may include Fe as a main component, and may include at least one or more first component selected from a group consisting of Cr, Co and Mo, and at least one or more second component selected from a group consisting of B, C, Si and Nb, and in this case, preferably, the second component may be at least two or more of B, C, Si, and Nb.

More specifically, the iron-based alloy may include the first component by 30 to 140 parts by weight, preferably 35 to 100 parts by weight, more preferably 40 to 92 parts by weight based on 100 parts by weight of Fe included in the alloy.

Among Cr, Mo, and Co, which may be included as a first component, the iron-based alloy may include Cr as a first component preferably, and may include Mo by 18.0 parts by weight or less, preferably 10.0 parts by weight or less based on 100 parts by weight of Fe.

Also, when the Fe-based alloy includes Cr, a content of Cr may be preferably 3 times or more, preferably 4 times or more, and the content may include the case in which Mo is not included as the first component and Cr is included.

When the content of Mo in the iron-based alloy satisfies the corresponding parts by weight range, and the contents of Cr and Mo satisfies the aforementioned ratio, an amorphous formation ability of the iron-based alloy may improve such that an alloy coating layer mainly including an amorphous phase may be formed, and abrasion resistance of the coating layer may improve, which may be an advantageous effect.

The iron-based alloy may include the second component by 4 to 20 parts by weight, preferably 5 to 19 parts by weight, based on 100 parts by weight of Fe.

In this case, the iron-based alloy may include at least two or more of B, C, Si and Nb as the second component, and may preferably include Si, Nb, or both Si and Nb as the second component. When the iron-based alloy includes Si, Nb, or both Si and Nb as the second component, that is, when the iron-based alloy includes Si and/or Nb, each of Si or Nb may be included in 9 parts by weight or less, preferably 1.5 to 8.0 parts by weight, more preferably 2.0 to 6.0 parts by weight.

When the second component of the iron-based alloy includes Si, Nb, or both SI and Nb, and the included Si or Nb is included in the aforementioned parts by weight range, an amorphous formation ability of the iron-based alloy may improve and an alloy coating layer mainly including an amorphous phase may be formed, and corrosion resistance of the coating layer may improve, which may be an advantageous effect.

Also, the present disclosure may further include at least one or more third components selected from a group consisting of W, Y, Mn, Al, Zr, Ni, Sc and P.

In this case, the total content of the third component to be added may be preferably less than 1.125 parts by weight, preferably 1.0 parts by weight or less, more preferably 0.083 parts by weight or less based on 100 parts by weight of Fe.

Also, the third component may be preferably included in 0.9 parts by weight or less and 0.05 parts by weight or less, respectively, based on 100 parts by weight of Fe, and when the third component is included in a content higher than the corresponding range, an amorphous formation ability may be significantly reduced, which may be problematic.

When the iron-based alloy includes the first component and the second component in the corresponding range, or includes the first to third components in the corresponding range and has a composition having an excellent amorphous formation ability, the iron-based alloy of the corresponding composition may be used as an amorphous alloy of the present disclosure, and when the parts by weight range of the first to third components is beyond the aforementioned range, an amorphous formation ability may be lowered, such that mechanical properties on the surface may degrade or a friction coefficient may increase, which may be problematic.

Iron (Fe) included as a component included in the alloy composition may be a component used to improve rigidity of the coating layer, and may be appropriately varied to match the strength of the target coating layer.

Chromium (Cr), which may be included as the first component, may be a component used to improve physical properties of the coating layer, such as, for example, abrasion resistance and corrosion resistance, and may form a chromium oxide film effective for improving high-temperature corrosion resistance, which may be advantageous.

Molybdenum (Mo), which may be included as the first component, may be used to provide physical and chemical properties of the coating layer, that is, for example, abrasion resistance and corrosion resistance, and also friction resistance.

Among the second components, boron (B), carbon (C), and silicon (Si) may be included to improve an amorphous formation ability by atomic size mismatch or packing efficiency with the remaining components. Nb may react with C, which is another second component included in the alloy, and may precipitate as carbide, and Nb may have excellent dispersibility in the matrix, such that heat resistance of the coating layer may improve and cracking due to large temperature changes may be prevented.

Also, nickel (Ni), which is an example of the third component additionally included, may form an austenite structure and may improve heat resistance and corrosion resistance of the alloy and the coating layer.

A thickness of the coating layer of the pipe according to an aspect of the present disclosure may be 100 μm to 600 μm preferably. Specifically, the coating layer may have a different thickness depending on conditions of an operating environment. For example, when temperature and corrosion conditions are not severe, a coating layer having a thickness of 300 μm to 400 μm may be provided preferably, and when environment condition is severe, a thickness of 400 to 500 μm or 500 μm to 600 μm may be preferable.

The thicker the coating layer, the longer the effect of life-extending may be, but when the thickness is greater than the corresponding range, the time for forming the coating layer and the consumption of the coating composition may increase, such that economic efficiency may be reduced, and it may be difficult to form the coating layer uniformly. When the thickness of the coating layer is less than the corresponding range, defects such as cracks may occur in the coating layer, and the effect of abrasion resistance and corrosion resistance may not be sufficient.

Meanwhile, when the alloy of the coating layer includes iron (Fe), which is the main metal included in the base material of the hollow tube body, as a main component, a difference in coefficients of thermal expansion between the two materials may be small, such that bonding may be stably performed while forming the pipe in which a difference in temperatures between the internal portion and the external portion is large.

Specifically, when an iron-based amorphous alloy including iron (Fe) in a high ratio in the amorphous alloy included in the coating layer is used, the coefficient of thermal expansion of the hollow tube body base material of the iron-based material and the coefficient of thermal expansion of the coating layer may have similar values, such that The difference in the coefficients of thermal expansion may be small. When the high-temperature condition of the pipe is used, the coating layer may not peel off from the base material or cracks, lifting phenomena, or the like, on an interfacial surface may not occur even when the surrounding temperature greatly changes.

In this case, the coefficient (A) of thermal expansion of the amorphous alloy included in the coating layer may have a small difference from the coefficient (B) of thermal expansion of the pipe base material, and specifically, the ratio of the coefficients of thermal expansion (A/B) may be 1.0 times to 1.4 times, preferably 1.0 to 1.3 times, and more preferably 1.2 to 1.25 times.

When the ratio of the coefficients of thermal expansion is smaller or larger than the corresponding range, the difference between the coefficients of thermal expansion between the base material and the coating layer may increase, and the bonding between the base material and the coating layer may be weakened or the lifespan of the coating layer may be reduced when changes in external temperature is high or under a high-temperature environment condition.

The method of forming the coating layer is not limited, and various coating methods may be used within the range which a person skilled in the art may consider as long as the coating layer of the corresponding composition may be formed by the coating method, and preferably, a high-speed flame spray (HVOF) method which may be directly used on site may be used.

When the coating layer is formed by the thermal spray coating method, the coating layer may be formed on an external surface of the hollow tube body base material, and for example, the coating layer may be formed on an external surface of a pipe used for a heat exchanger or a turbine. In the thermal spray coating, an alloy wire or alloy powder may be used as a coating material, and an alloy powder may preferably be used.

When an alloy powder is used as an alloy raw material (feed stock) in the alloy coating, a coating layer having a desired alloy composition may be formed by preparing an alloy powder having a desired alloy composition.

When the alloy powder is prepared by an atomizing method, an alloy powder including an amorphous phase in a high ratio may be used, where the ratio of the amorphous phase may include 90% or more, 95% or more, 97% or more, 99% or more, 99.9% or more, substantially 100%, and when the above-described alloy composition is used, an alloy powder having an amorphous phase in a high ratio may be prepared due to a high amorphous formation ability.

Generally, a coating layer may fall under a relationship in which, when wear resistance improves, corrosion resistance may be lowered or, conversely, when corrosion resistance improves, wear resistance may be lowered. However, since the alloy coating layer having a high amorphous ratio as in an embodiment of the present disclosure may have high abrasion resistance and may have excellent corrosion resistance due to amorphous properties, when the coating layer is formed on the surface of a pipe which may be damaged by both corrosion and wear, an excellent effect may be obtained.

The iron-based amorphous alloy powder may maintain the above-described amorphous ratio even when re-melted or exposed to high temperature and cooled again and solidified. In this case, an amorphous ratio (a) in the iron-based amorphous alloy powder prepared by an atomizing method and an amorphous ratio (b) of the alloy coating layer formed using the iron-based amorphous alloy powder may satisfy the equation as below.

$$0.9 \leq b/a \leq 1 \quad \text{(Equation 1)}$$

Here, as a method of forming the coating layer using an iron-based amorphous alloy powder to derive (b), a thermal spray method including thermal spray coating, cold spray, or the like, and a general coating method such as sputtering and deposition may be included.

Also, the b/a ratio in (Equation 1) may be preferably 0.95 to 1.0, more preferably 0.98 to 1, and even more preferably 0.99 to 1.

The iron-based amorphous alloy powder used as a feedstock of the thermal spray coating according to an embodiment of the present disclosure may have an average particle diameter in the range of 1 μm to 150 μm, but is not limited thereto. Depending on the use, the powder particle size may be adjusted through sieving.

The coating layer of the pipe according to an embodiment of the present disclosure may include an amorphous alloy and may have excellent corrosion resistance. In particular, even when the coating layer is formed to have a relatively thin thickness, the coating layer may have excellent corrosion resistance and may thus have a high lifespan, and since the thickness may be reduced, heat transfer efficiency may improve.

The pipe of the present disclosure may include an intermediate layer or a bonding layer between the base material and the coating layer, but the bonding layer is not necessarily included, and the amorphous alloy coating layer may be formed directly on the surface of the base material without including the bonding layer. Since the coefficient of thermal expansion of the amorphous alloy coating layer may be configured similarly to that of the pipe base material, even when the bonding layer is not provided, problems such as peeling or cracking may not occur. Accordingly, to simplify the coating process and to improve economic efficiency, it may be preferable not to form the intermediate layer or the bonding layer.

Another embodiment of the present disclosure discloses a pipe including a first coating layer formed directly on the surface of the hollow tube body and a second coating layer formed on the first coating layer when the coating layer is formed on the surface of the hollow tube body.

The first and second coating layers may be formed of an amorphous alloy, and may include coating layers having different compositions or coating layers having the same composition and formed by different coating methods, and the coating layers may have different amorphous compositions or ratios or different porosities.

When the amorphous alloy layers formed by different coating methods is formed on the hollow tube body, for example, thermal spray coating, low temperature thermal spraying, electroplating or electroless plating may be used.

When the ratios of amorphous phases of the first and second coating layers are different from each other, the ratio of the amorphous phase of the second coating layer exposed to the external environment may be higher than the ratio of the amorphous phase of the first coating layer preferably.

The porosity of the coating layer may vary depending on the coating method, but it may be preferable to have a low porosity, and the porosity of the second coating layer may be equal to or less than the porosity of the first coating layer preferably.

MODE FOR INVENTION

Another aspect of the present disclosure is a method of forming a coating layer. The method of forming the coating layer may include preparing an molten alloy, preparing an alloy powder, and forming a coating layer.

The preparing an molten alloy may include preparing a melt by melting at a high temperature to prepare an alloy according to a composition of a predetermined weight ratio. A melting method for melting an alloy raw material is not limited, and any method which may be used by a person skilled in the art, such as induction heating, to prepare the molten alloy may be used.

The composition of the molten alloy, which may be prepared by putting in raw materials including the elements included in the composition of the alloy according to the weight ratio calculated in advance and melting the raw materials may be the same as the composition of the aforementioned coating layer, or may be a composition adjusted to include some elements which may be lost in the melting process in a higher content.

The composition of the molten alloy may include Fe as a main component, and may include at least one or more first component selected from the group consisting of Cr, Co and Mo, and at least one or more second component selected from the group consisting of B, C, Si and Nb, and may further include at least one or more third components selected from the group consisting W, Y, Mn, Al, Zr, Ni, Sc and P. In this case, the second component may be at least two or more of B, C, Si and Nb preferably.

The molten alloy may include Fe as a main component, and may include the first component by 30 to 140 parts by weight, preferably 35 to 100 parts by weight, more preferably 40 to 92 parts by weight based on 100 parts by weight of Fe.

Among Cr, Mo, and Co, which may be included as the first component, the iron-based alloy may include Cr as the first component preferably, and may include Mo by 18.0 parts by weight or less, preferably 10.0 parts by weight or less based on 100 parts by weight of Fe.

Also, when the Fe-based alloy includes Cr, the content of Cr may be preferably 3 times or more, preferably 4 times or more, the content of Mo, which is when Mo is not included as the first component and Cr is included, and the content may include the case in which Mo is not included as the first component and Cr is included.

When the content of Mo in the iron-based alloy satisfies the corresponding parts by weight range, and the contents of Cr and Mo satisfies the aforementioned ratio, an amorphous formation ability of the iron-based alloy may improve such that an alloy coating layer mainly including an amorphous phase may be formed, and abrasion resistance of the coating layer may improve, which may be an advantageous effect.

The iron-based alloy may include the second component by 4 to 20 parts by weight, preferably 5 to 19 parts by weight, based on 100 parts by weight of Fe.

In this case, the iron-based alloy may include at least two or more of B, C, Si and Nb as the second component, and may preferably include Si, Nb, or both Si and Nb as the second component. When the iron-based alloy includes Si, Nb, or both Si and Nb as the second component, that is, when the iron-based alloy includes Si and/or Nb, each of Si or Nb may be included in 9 parts by weight or less, preferably 1.5 to 8.0 parts by weight, more preferably 2.0 to 6.0 parts by weight.

When the second component of the iron-based alloy includes Si, Nb, or both SI and Nb, and the included Si or Nb is included in the aforementioned parts by weight range, an amorphous formation ability of the iron-based alloy may improve and an alloy coating layer mainly including an amorphous phase may be formed, and corrosion resistance of the coating layer may improve, which may be an advantageous effect.

Also, a third component may be further included based on 100 parts by weight of Fe, and the total content of the third component to be added may be preferably less than 1.125 parts by weight, preferably 1.0 parts by weight or less, more preferably 0.083 parts by weight or less.

In this case, the third component may be preferably included in 0.9 parts by weight or less and 0.05 parts by weight or less based on 100 parts by weight of Fe, and when the third component is included in a content higher than the corresponding range, an amorphous formation ability may be significantly reduced.

When the molten alloy includes the first component and the second component in the corresponding range, or includes the first to third components in the corresponding range and has a composition having an excellent amorphous formation ability, the alloy obtained by cooling the molten alloy of the corresponding composition may be used as a coating layer of the present disclosure, and when the parts by weight range of the first to third components is beyond the aforementioned range, an amorphous formation ability of the alloy composition may be lowered, such that mechanical properties on the surface may degrade or a friction coefficient may increase, which may be problematic.

The preparing the alloy powder may include preparing the molten alloy in the form of a powder. The form of the powder particle is not limited, and various forms such as a spherical shape and a flake type may be used.

The molten alloy may be prepared by a well-known method, such as, for example, an atomizing method. Since the atomizing method is one of the known techniques for preparing a metal powder, a detailed description thereof is not provided herein.

The atomizing method may be to prepare an alloy powder by splitting the molten alloy by spraying a gas or water when dropping the molten alloy, and rapidly cooling the alloy powder in the split droplet state. To prepare an amorphous powder in the atomizing method, it may be necessary to rapidly cool the split droplets because, as the molten alloy solidifies without time to crystallize, it may be advantageous to become amorphous.

Therefore, to prepare an alloy powder having a higher ratio of amorphous phase by the atomizing method, it may be necessary to have a special cooling facility which may increase the cooling rate.

The alloy powder may have the same alloy composition as that of the molten alloy, and since the embodiments of the present disclosure have the above-described alloy composition, the amorphous formation ability for forming an amorphous phase in a high ratio in the alloy composition may be excellent, such that, even when the general atomizing method is used, a powder including an amorphous phase in a high ratio may be prepared.

That is, in the case of a general atomizing method which does not have a special cooling facility, an amorphous powder may be prepared using the alloy composition of this embodiment even under a cooling rate of $10^2$ to $10^3$ or $10^1$ to $10^4$ (° C./sec). In this case, the rate $10^{1~2}$ (° C./sec) may be a cooling rate substantially close to air cooling, and may be a cooling rate of when the alloy solution is ejected into the air.

The forming the coating layer may include forming a coating layer from the amorphous alloy powder on the surface of the base material. The forming the coating layer may include bonding the hollow tube body to the coating layer by thermally spraying the alloy powder directly on the surface of the hollow tube body, and the coating method is not limited, but a thermal spraying method may be preferably used, and preferably, a high velocity oxygen fuel method may be used.

Spraying may be a method of heating a metal or a metal compound to form a fine volumetric shape and spraying the metal on the surface of a processed object to be adhered thereto, and may include high-speed flame spray coating (HVOF), plasma coating, laser cladding coating, general flame spray coating, diffusion coating and cold spray coating, vacuum plasma coating (VPS), and low-pressure plasma spray (LPPS).

The iron-based amorphous alloy powder according to the present disclosure may have excellent amorphous formation ability to form amorphous even without securing a rapid cooling rate, and even when going through the process of forming the above-described coating layer, the ratio of amorphous may not decrease in the coating layer.

That is, when the iron-based amorphous alloy powder of the present disclosure, which is a powder including an amorphous phase in a high ratio, the ratio including 90% or more, 95% or more, 99% or more, 99.9% or more, substantially 100%, is used as a material for thermal spraying, since the coating layer includes an amorphous phase in 90% or more, 95% or more, 99% or more, 99.9% or more, and substantially 100% by volume with respect to the entire structure, physical properties may be excellent.

In particular, when high-speed flame spray coating is performed using the alloy powder of the present disclosure, the amorphous ratio may be substantially maintained as is such that the degree of improvement of physical properties may be maximized.

Also, the iron-based amorphous alloy powder according to the present disclosure may have a very high coating density of 98 to 99.9%, and penetration of corrosives through pores may be prevented.

The particle size of the alloy powder used for thermal spray coating may be 10 μm to 100 μm, preferably 15 μm to 55 μm, and when the particle size of the alloy powder is less than 10 μm, small particles may stick to the thermal spray coating gun in the thermal spray coating process, such that work efficiency may decrease. When size exceeds 100 μm, the powder particles may not be completely dissolved and may collide with the base material (that is, the powder particles may falls to the floor without forming a coating layer), such that coating productivity and efficiency may be lowered, which may be problematic.

On the other hand, the Vickers hardness of the coating layer including the iron-based amorphous alloy powder according to the present disclosure may be 700 to 1,200 Hv (0.2), preferably 800 to 1,000 Hv (0.2), and the coefficient of friction (friction resistance) may be 100N 0.001 μm to 0.08 μm, preferably 0.05 μm or less under a load of 100N, and may be 0.06 μm to 0.12 μm, preferably 0.10 μm or less under a load of 1,000N.

In particular, in the case of the coating layer by high velocity oxygen fuel, differently from the conventional case, there may be almost no pores in the cross-section, such that full density may be exhibited, and even when there are pores, porosity may be only about 0.1% to 1.0%.

That is, when high-speed flame spray coating is performed, a structure in which several passes are stacked may be formed, and specifically, oxides of metals observed mainly in black may be accumulated on each layer, and a plurality of layers may be laminated in a shape such as a wave. Generally, accordingly, properties of the coating layer may be deteriorated and weakened, but in the present disclosure, since the coating layer has no pores/oxide film, ultra-high density may be exhibited, and coating performance may improve. Also, abrasion resistance, corrosion resistance and elasticity of the coating layer including the iron-based amorphous alloy powder may also be excellent as compared to the case of using the conventional alloy powder.

An embodiment of the present disclosure may further include performing a surface treatment on the surface of the base material to improve adhesion between the base material and the coating layer by treating the surface of the base material before the forming the coating layer.

The performing a surface treatment on the surface of the base material may obtain a more excellent effect when the coating layer is directly formed on the surface of the base material by the forming the coating layer and an intermediate layer or an adhesive layer is not required between the coating layer and the base material. In the performing a surface treatment on the surface of the base material, various surface treatment methods to remove the preformed coating layer, rust, foreign substances, or the like, on the surface of the base material, or to remove serrations and unevenness on the surface, to improve the surface roughness to prevent peeling of the coating layer and to increase adhesion may be used, and for example, blasting may be used.

The performing a surface treatment on the surface of the base material may include removing scale, rust, coating film, or the like, on the surface of the base material using a blasting equipment and forming appropriate surface roughness to increase adhesion.

Also, performing a surface treatment on the coating layer for treating the surface of the coating layer may be further included after the forming the coating layer. The performing a surface treatment on the coating layer may be included to block or fill pores on the surface of the coating layer after the coating layer is formed from the iron-based amorphous alloy powder so as to improve corrosion resistance effect of the coating layer and to extend the lifespan.

In the performing a surface treatment on the coating layer, a material, such as, for example, a sealing agent, which may be formed on the surface and may block the pores by penetrating into pores penetrating into the coating layer, and which may enhance corrosion resistance performance of the coating layer against external corrosive substances may be formed on the surface of the coating layer.

The material of the sealing agent is not limited, but a material which may be applicable even at high temperature and a large temperature difference may be preferably used, and for example, a thermosetting or high temperature epoxy resin may be used preferably.

While the example embodiments have been illustrated and described above, it will be apparent to those skilled in the art that modifications and variations could be made without departing from the scope of the present disclosure as defined by the appended claims.

EXAMPLE

Examples 1 to 8: Preparation of Coating Body Using Iron-Based Amorphous Alloy Powder With the components and weight ratio composition as in Table 1 below, a material was supplied into an atomizer under a nitrogen gas atmosphere, atomized in a molten state, and cooled at the cooling rate as in Table 1, thereby preparing the iron-based amorphous alloy powder of examples 1 to 8.

Then, using the iron-based amorphous alloy powder of examples 1 to 8, as the device name Oerlikon Metco Diamond Jet series HVOF gas fuel spray system, oxygen and propane gas were used as fuel, and the spray distance was determined to be 30 cm, and a coating layer was formed on the surface of the iron-based base material to have a thickness of about 0.3 mm by high velocity oxygen fuel (HVOF). The device and specific conditions used at this time are as below.

DJ Gun HVOF

[Conditions] Gun type: Hybrid, Air cap: 2701, LPG Flow 160 SCFH, LPG Pressure 90 PSI, Oxygen flow 550 SCFH, Oxygen Pressure 150 PSI, Airflow Air flow 900 SCFH, Air Pressure 100 PSI, Nitrogen flow 28 SCFH, Nitrogen Pressure 150 PSI, Gun speed: 100 m/min, Gun pitch: 3.0 mm, Feeder rate 45 g/min, Stand-off distance: 250 mm

TABLE 1

| Classification | Example 1 | Example 2 | Example 3 | Example 4 | Example 5 | Example 6 | Example 7 | Example 8 |
| --- | --- | --- | --- | --- | --- | --- | --- | --- |
| Fe | 100 | 100 | 100 | 100 | 100 | 100 | 100 | 100 |
| Cr | 55.0 | 26.2 | 35.5 | 35.5 | 29.2 | 37.4 | 90.8 | 32.1 |
| Mo | 84.0 | 36.4 | 64.5 | 64.5 | 50.2 | 41.1 | — | 7.9 |
| C | 6.0 | — | 9.2 | 9.2 | 8.0 | 5.6 | — | 0.5 |
| B | — | 4.2 | — | 10.3 | 9.2 | 4.0 | 13.6 | 2.7 |
| Nb | — | — | — | — | — | — | — | 2.5 |
| Si | — | — | — | — | — | — | 5.3 | — |
| Cooling rate (° C./sec) | $10^4$ | $10^4$ | $10^4$ | $10^2$ | $10^2$ | $10^2$ | $10^4$ | $10^3$ |
| Crystalline state | mostly amorphous | mostly amorphous | mostly amorphous | mostly amorphous | mostly amorphous | mostly amorphous | mostly amorphous | mostly amorphous |
| *Powder average particle size | 31 | 27 | 30 | 33 | 31 | 29 | 32 | 29 |

*D50 (unit: μm)

As indicated in Table 1, the examples according to the present disclosure included the iron-based alloy composition, was cooled by an atomized method such that an alloy powder having an average particle diameter of 20 µm to 40 µm was prepared.

COMPARATIVE EXAMPLE

Comparative Examples 1 to 7: Manufacture Coating Body Using Iron-Based Alloy Powder A material of the composition of the components and weight ratios as in Table 2 below was supplied into an atomizer under a nitrogen gas atmosphere, atomized in a molten state, and cooled at the cooling rate as in Table 2, thereby preparing the iron-based alloy powders of comparative examples 1 to 7.

Thereafter, the coating layer was formed by high velocity oxygen fuel using the prepared alloy powder by the same method as in the examples.

TABLE 2

| Classification | Comparative example1 | Comparative example2 | Comparative example3 | Comparative example4 | Comparative example5 | Comparative example6 | Comparative example7 |
|---|---|---|---|---|---|---|---|
| Fe | 100 | 100 | 100 | 100 | 100 | 100 | 100 |
| Cr | 56.2 | 71.4 | 55.0 | 19.6 | 20.3 | 71.4 | 41.1 |
| Mo | 30.0 | 34.5 | 18.3 | 68.6 | 85.0 | 24.5 | 37.4 |
| C | — | 2.0 | 2.8 | 2.0 | — | 6.0 | 2.8 |
| B | — | — | 7.3 | 5.9 | 4.1 | — | 5.6 |
| Nb | — | — | — | — | — | — | — |
| Si | — | — | — | — | 0.5 | 0.1 | 0.05 |
| Cooling rate (° C./sec) | 10$^4$ | 10$^4$ | 10$^2$ | 10$^2$ | 10$^4$ | 10$^3$ | 10$^2$ |
| Crystalline state | mostly crystalline | mostly crystalline | mostly crystalline | mostly crystalline | mostly crystalline | mostly crystalline | mostly crystalline |
| *Powder average particle size | 5 | 10 | 50 | 50 | 5 | 20 | 50 |

*D50 (unit: µm)

As indicated in Table 2, the comparative examples according to the present disclosure included the composition components in a specific content range, were cooled by an atomized method, such that an alloy powder having an average particle diameter of 5 µm to 50 µm was prepared.

Comparative Examples 8 to 9: Preparation of Corrosion-Resistant Coating Layer

The coating layers of comparative example 8 (Inconel 625) and comparative example 9 (Hastelloy C276) were prepared as a commercial alloy coating layer having excellent corrosion resistance and used for various purposes. The composition data of the used alloys are listed in Table 3 as below.

TABLE 3

| Composition (at %) | Comparative example 8 | Comparative example 9 |
|---|---|---|
| Fe (at %) | 5.0 or less | 4.00~7.00 |
| Ni (at %) | 58.0 or more | Remainder |
| Cr (at %) | 20.0~23.0 | 14.50~16.50 |
| Mo (at %) | 8.0~10.0 | 15.00~17.00 |
| C (at %) | 0.1 or less | 0.01 or less |
| Mn (at %) | 0.5 or less | 1.00 or less |
| Co (at %) | 1.0 or less | 2.50 or less |
| Si (at %) | 0.5 or less | 0.08 or less |

TABLE 3-continued

| Composition (at %) | Comparative example 8 | Comparative example 9 |
|---|---|---|
| Nb (at %) | 3.15~4.15 | — |
| P (at %) | 0.015 or less | 0.04 or less |
| S (at %) | 0.015 or less | 0.03 |
| W (at %) | — | 3.00~4.50 |
| Al (at %) | 0.40 or less | — |
| V (at %) | — | 0.35 or less |
| Ti (at %) | 0.40 or less | — |

EXPERIMENTAL EXAMPLE

Experimental Example 1: Evaluation of Hardness and Porosity of Thermal Spray Coating Layer using Alloy Powder As for the thermal spray coating layers of examples 3, 4, 6, 7 and 8 and comparative examples 1 to 4, micro-hardness test was performed on the cross-section of the coating layer sample using a HVS-10 digital low load Vickers Hardness Tester Machine, and the porosity was measured by observing the cross-section of the sample using an optical microscope (Leica DM4 M), and the results are listed in Table 4 below.

TABLE 4

| Classification | area | Test value HV$_{0.2}$ | Average HV$_{0.2}$ | Thickness (μm) | Porosity (%) |
|---|---|---|---|---|---|
| Example 3 | Cross-section | 802/754/828/765/710 | 771 | 297 | 0.08 |
| Example 4 | Cross-section | 898/834/944/848/789 | 862 | 288 | 0.11 |
| Example 6 | Cross-section | 1304/1139/1097/1194/1139 | 1174 | 312 | 0.02 |
| Example 7 | Cross-section | 892/788/811/828/843 | 832 | 300 | 0.04 |
| Example 8 | Cross-section | 910/899/869/937/922 | 907 | 301 | 0.05 |
| Comparative example 1 | Cross-section | 669/756/623/689/683 | 684 | 305 | 0.32 |
| Comparative example 2 | Cross-section | 928/862/876/921/802 | 877 | 291 | 0.15 |
| Comparative example 3 | Cross-section | 828/848/1012/944/771 | 880 | 332 | 0.23 |
| Comparative example 4 | Cross-section | 821/855/808/783/633 | 780 | 275 | 0.17 |

Figure 1:
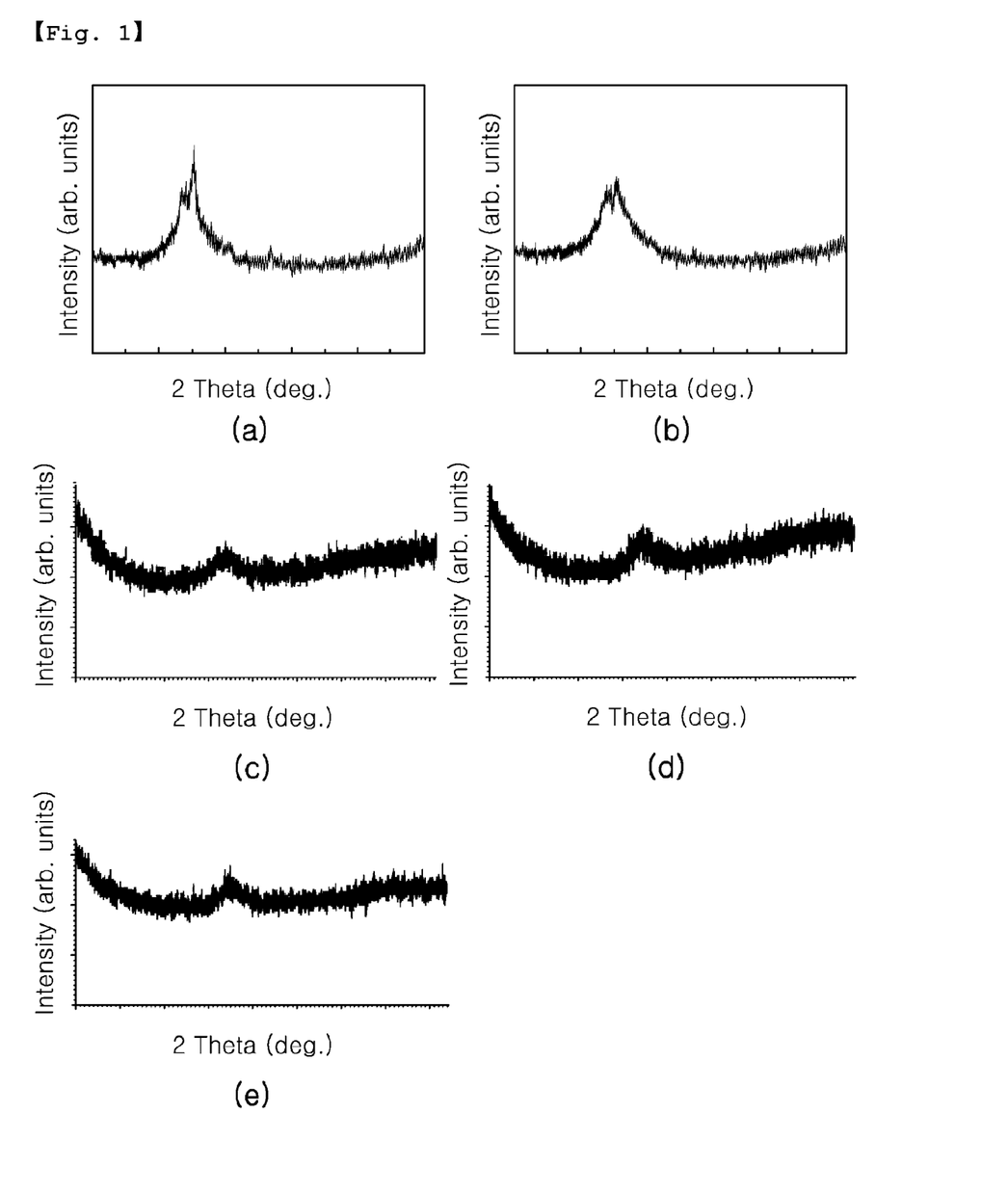
FIG. 1 is XRD graphs of a coating layer sample according to the present disclosure, where (a) to (e) are XRD graphs of a coating layer example sample to which an iron-based amorphous alloy powder of examples 1, 3, 4, 5, and 6 is applied, respectively.

Experimental Example 2: Evaluation of Degree of Amorphous Coating Layer Using Alloy Powder Amorphous XRD graphs for the iron-based amorphous alloy powder coating layer samples prepared in examples 1, 3, 4, 5, and 6 are illustrated in FIG. 1. FIG. 1 are XRD graphs of coating layer samples according to the present disclosure, where (a) to (e) are XRD graphs of the coating layer samples to which the iron-based amorphous alloy powder of examples 1, 3, 4, 5, and 6 is applied, respectively.

According to FIG. 1, since no additional peak was identified along with the broad XRD first peak in the examples, it was found that the powder according to the present disclosure had an amorphous structure.

Figure 2:
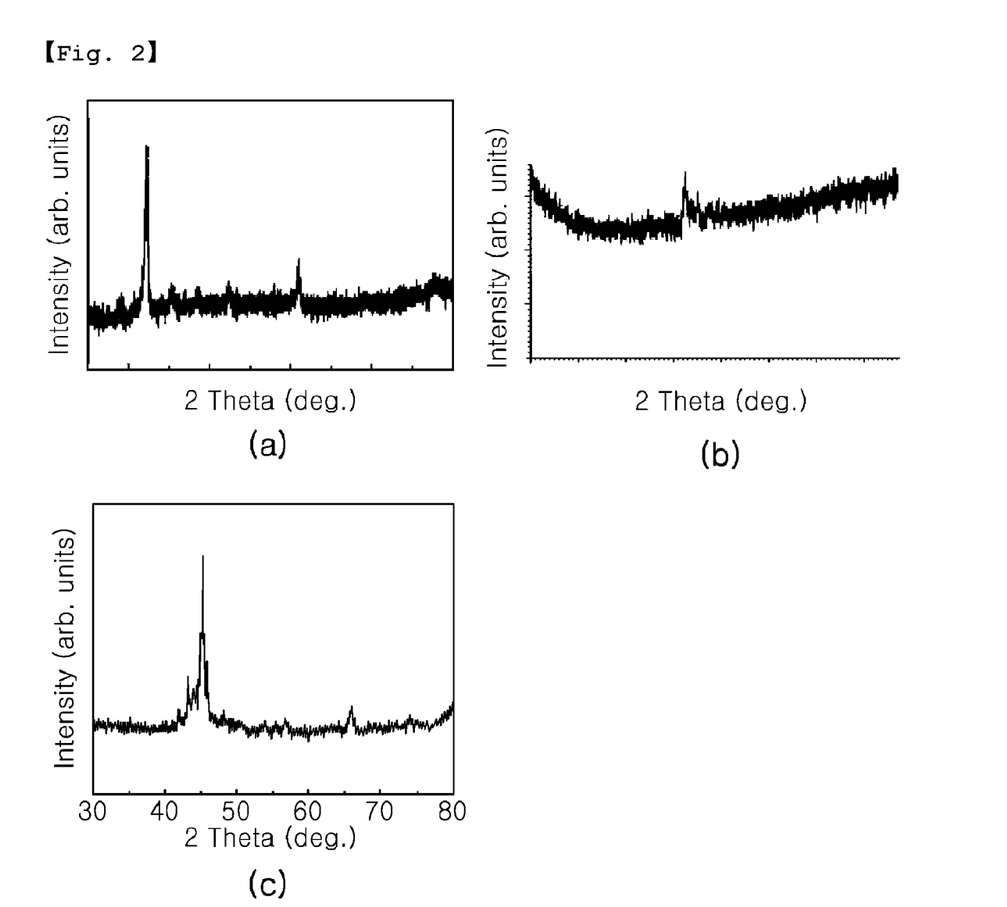
FIG. 2 is XRD graphs of a coating layer sample according to the present disclosure, where (a) to (c) are XRD graphs of a coating layer example sample to which an iron-based amorphous alloy powder of examples 1, 3, and 4 is applied, respectively.

Also, XRD graphs for the iron-based alloy powder coating layer samples prepared in comparative example are illustrated in FIG. 2. FIG. 2 is XRD graphs of coating layer samples of comparative examples, where (a) to (c) are XRD graphs of coating layer samples to which the iron-based alloy powder of comparative examples 1, 3, and 4 is applied, respectively.

According to FIG. 2, in the comparative examples, it was found that the crystalline powder having a structure without an amorphous phase was prepared according to an additional peak along with a sharp first peak.

Experimental Example 3: Evaluation of Coefficient of Thermal Expansion of Coating Layer The coefficients of thermal expansion of the amorphous alloy coating layer samples of Examples 6 to 8 and Comparative Examples 1 to 3 were measured, and the ratio values with the coefficient of thermal expansion of the base material were calculated and listed in Table 5 below.

As the base material, a generally used cast iron material was used, and the coefficient of thermal expansion of cast iron was based on 10.2 ppm/° C.

TABLE 5

| Classification | Coefficient of thermal expansion (ppm/° C.) | Coefficient of thermal expansion and ratio of base material (times) |
|---|---|---|
| Example 6 | 12.5 | 1.23 |
| Example 7 | 12.4 | 1.22 |
| Example 8 | 12.5 | 1.23 |
| Comparative example 1 | 14.6 | 1.43 |
| Comparative example 2 | 14.6 | 1.43 |
| Comparative example 3 | 14.4 | 1.41 |

Experimental Example 4: Evaluation of Corrosion Resistance of Coating Layer

Figure 3:
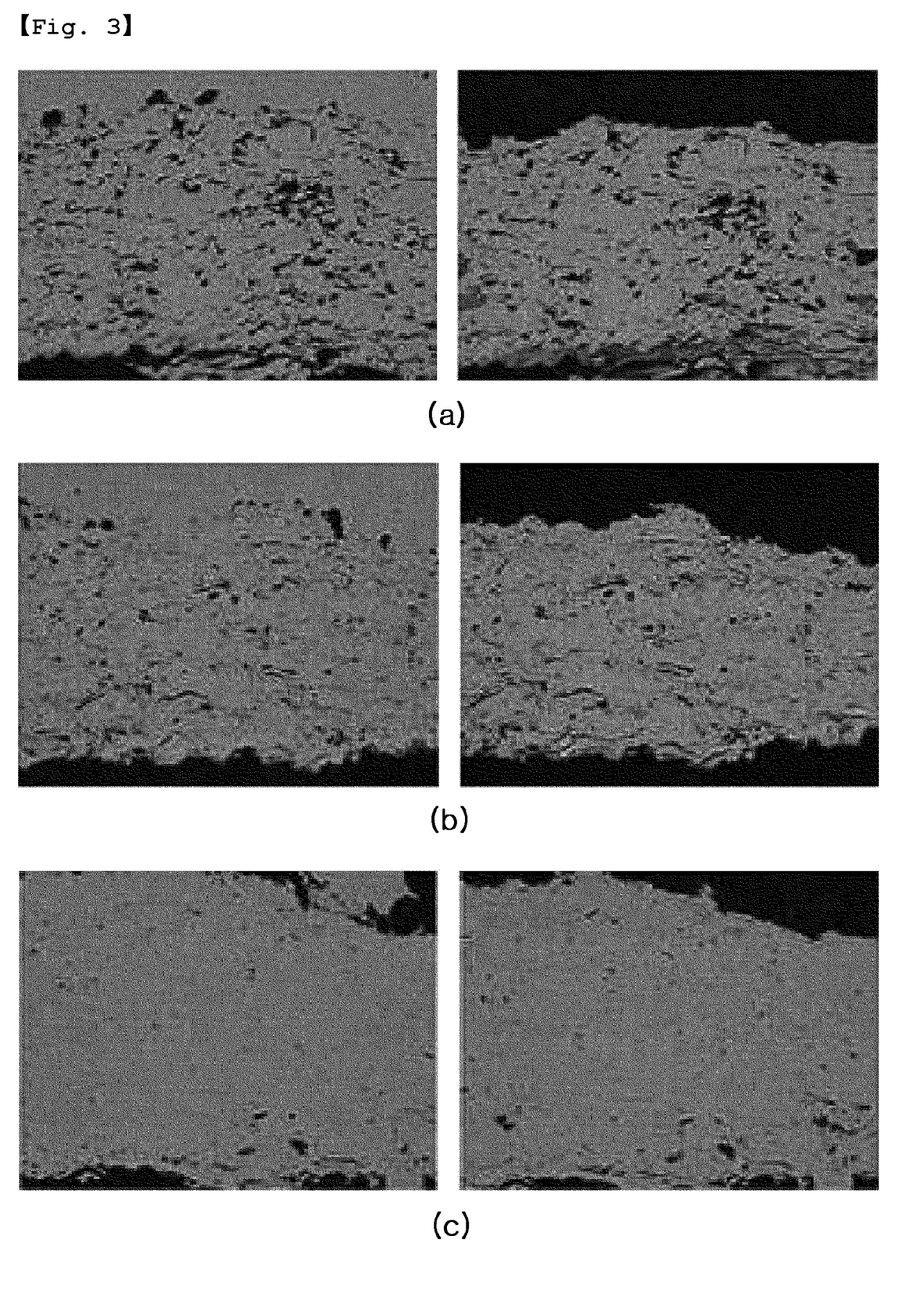
FIG. 3 is images (200× magnification) of a non-corroded/corroded cross-section of a thermal spray coating layer sample using an iron-based amorphous alloy powder of an example according to the present disclosure, observed using an optical microscope, where (a) to (c) are observed images of samples of examples 2, 5, and 7, respectively.
Figure 4:
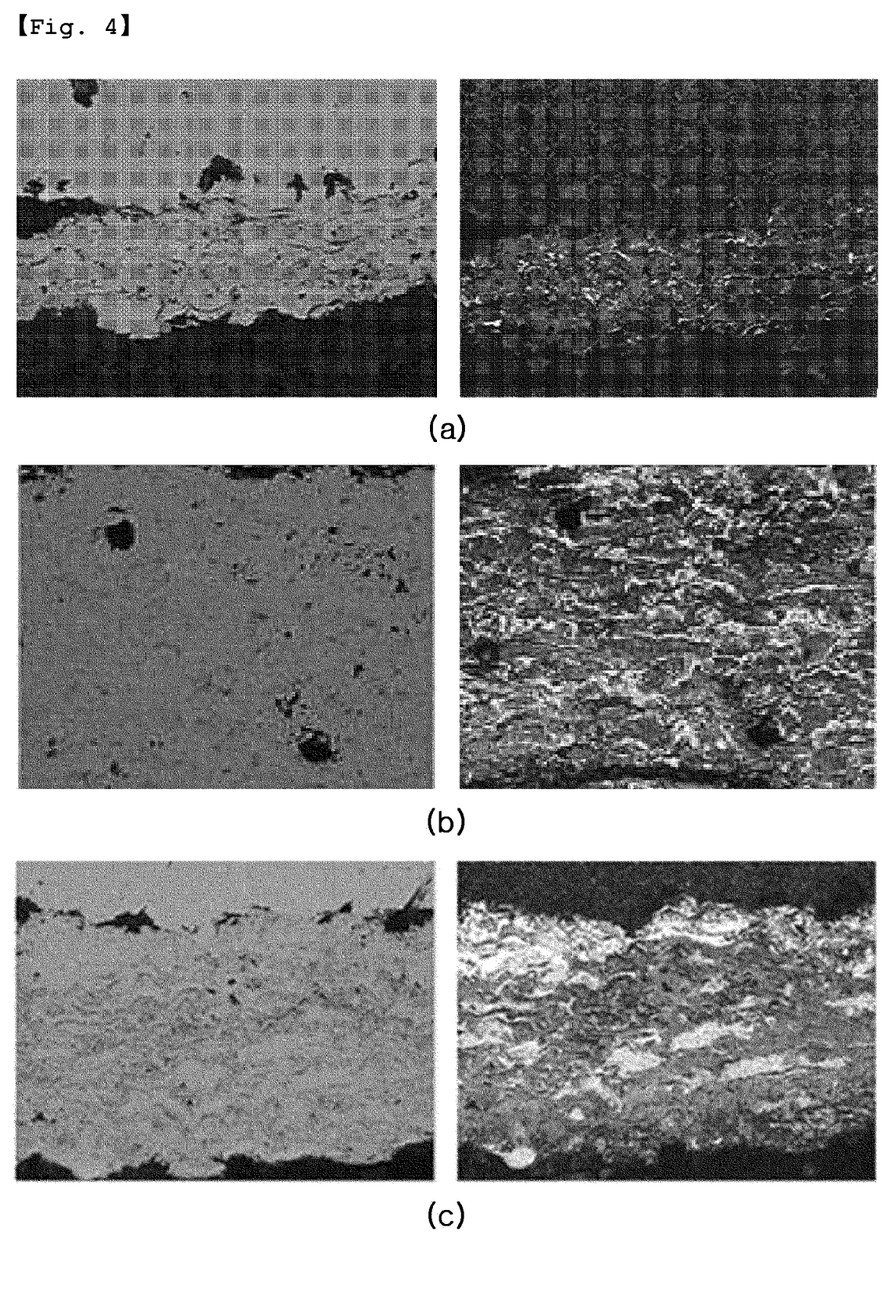
FIG. 4 is images (200× magnification) of a non-corroded/corroded cross-section of a thermal spray coating layer sample using an iron-based amorphous alloy powder of a comparative example, observed using an optical microscope, where (a) to (c) are observed images of samples of comparative examples 5, 6, and 7, respectively.

FIG. 3 is images of a non-corroded/corroded cross-section of a thermal spray coating layer sample using an iron-based amorphous alloy powder of an example according to the present disclosure, observed using an optical microscope, where (a) to (c) are observed images of samples of examples 2, 5, and 7, respectively. FIG. 4 is images of a non-corroded/corroded cross-section of a thermal spray coating layer sample using an iron-based amorphous alloy powder of a comparative example, observed using an optical microscope, where (a) to (c) are observed images of samples of comparative examples 5, 6, and 7, respectively.

Specifically, each of the thermal spray coating layer samples was immersed in a sulfuric acid (H$_2$SO$_4$) solution having a concentration of 95 to 98% under room temperature for 5 minutes, the cross-section and surface of the non-corroded coating layer sample and the corroded coating layer sample were observed using an optical microscope (Leica DMA M), and non-corrosive materials are illustrated on the left side, and corrosive substances are illustrated on the right side in FIGS. 3 and 4.

As a result of the observation, when the coating layer samples of examples 2, 5, and 7 were used, there was no significant difference in appearance before and after immersion in sulfuric acid as illustrated in FIG. 3, such that it was confirmed that the corrosion resistance was the best.

On the other hand, when the coating layer samples of comparative Examples 5, 6, and 7 were used, as illustrated in FIG. 4, corrosion occurred strongly, indicating very poor corrosion resistance was exhibited.

This is due to whether the coating layer is amorphous, and in the case of the example, the coating layer did not react at all to the strong acid corrosion, whereas in the case of the comparative example including the crystalline, the coating layer reacted to the corrosion material and corroded, such that poor corrosion resistance was exhibited.

Experimental Example 5: Evaluation of High-Temperature Corrosion Resistance of Coating Layer The coating layer samples of examples 5, 7 and 8, the coating layer of comparative example 8 (Inconel 625), and the coating layer of comparative example 9 (Hastelloy C276) were corroded under conditions similar to those of a biomass power plant environment, and the high-temperature corrosion resistance of each coating layer was measured by measuring a thickness (mm) of the coating layer reduced by corrosion was measured, the corrosion rate (nm/hr) was calculated by dividing the reduced thickness (mm) by the corrosion time (hr), and the results are listed in Table 6 below.

The corrosion conditions used in the experiment were a temperature of 700° C., the surrounding environment was 10% $O_2$, 1000 ppm of $Cl_2$, and a balance of $N_2$, and the corrosion time was 1,000 hours.

TABLE 6

| Classification | Corrosion rate (nm/hr) |
|---|---|
| Example 5 | 5 |
| Example 7 | 4 |
| Example 8 | 4 |
| Comparative example 8 (Inconel 625) | 40 |
| Comparative example 9 (Hastelloy C276) | 47 |

While the example embodiments have been illustrated and described above, it will be apparent to those skilled in the art that modifications and variations could be made without departing from the scope of the present disclosure as defined by the appended claims.

The invention claimed is:

1. A pipe, comprising:
   a hollow tube body in which fluids having different temperatures pass through the inside and the outside thereof; and
   a coating layer provided on an external surface of the hollow tube body and having an alloy including an amorphous phase,
   wherein the alloy includes iron (Fe),
   a first component consisting of chromium (Cr) and molybdenum (Mo), and at least one or more second components selected from a group consisting of boron (B), carbon (C), silicon (Si) and niobium (Nb),
   wherein the first component is included in 30 to 140 parts by weight based on 100 parts by weight of iron (Fe).

2. The pipe of claim 1, wherein a coefficient of thermal expansion of the alloy is 1.0 to 1.4 times a coefficient of thermal expansion of the hollow tube body.

3. The pipe of claim 2, wherein the hollow tube body is formed of a material including iron (Fe).

4. The pipe of claim 1, wherein the second component is included in 4 to 20 parts by weight based on 100 parts by weight of Fe.

5. The pipe of claim 1, wherein the second component is at least two or more selected from a group consisting of B, C, Si and Nb.

6. The pipe of claim 1, wherein the alloy includes at least one or more third component selected from a group consisting of tungsten (W), yttrium (Y), manganese (Mn), aluminum (Al), zirconium (Zr), nickel (Ni), scandium (Sc) and phosphorus (P).

7. The pipe of claim 6, wherein the third component is included in less than 1.125 parts by weight based on 100 parts by weight of Fe.

8. The pipe of claim 1 wherein a thickness of the coating layer is 100 µm to 600 µm.

9. The pipe of claim 1 wherein the coating layer has a coating density of 98 to 99.9%.

10. The pipe of claim 1 wherein a Vickers hardness of the coating layer is 700 to 1,200 Hv.

* * * * *